United States Patent [19]

Paranjpe et al.

[11] 4,245,226

[45] Jan. 13, 1981

[54] INK JET PRINTER WITH HEATED DEFLECTION ELECTRODE

[75] Inventors: Suresh C. Paranjpe, Dallas, Tex.; John A. Robertson, Chillicothe, Ohio

[73] Assignee: The Mead Corporation, Dayton, Ohio

[21] Appl. No.: 55,411

[22] Filed: Jul. 6, 1979

[51] Int. Cl.[3] .............................................. G01D 15/16

[52] U.S. Cl. .................................. 346/75; 346/140 R

[58] Field of Search .................................. 346/75, 140

[56] References Cited

U.S. PATENT DOCUMENTS

| | | | |
|---|---|---|---|
| 3,701,998 | 10/1972 | Mathis | 346/75 |
| 3,739,393 | 6/1973 | Lyon | 346/75 X |
| 3,777,307 | 12/1973 | Duffield | 346/75 |
| 3,787,883 | 1/1974 | Cassill | 346/75 |
| 3,813,675 | 5/1974 | Steffy | 346/75 |
| 3,955,203 | 5/1976 | Chocholaty | 346/75 |
| 4,023,183 | 5/1977 | Takano | 346/75 |
| 4,031,563 | 6/1977 | Paranjpe | 346/75 |
| 4,050,377 | 9/1977 | Watanabe | 346/75 X |
| 4,184,167 | 1/1980 | Vandervalk | 346/75 |

*Primary Examiner*—Joseph W. Hartary

*Attorney, Agent, or Firm*—Biebel, French & Nauman

[57] ABSTRACT

An ink jet printer utilizes a substantially electrically conductive deflection electrode which extends generally parallel to at least one row of ink jet drop streams and has a d.c. electrical deflection potential impressed thereon to produce a static electrical deflection field through which drops in the drop streams pass. The deflection electrode is heated by passing a resistive heating current through the electrode and is held by a spring mounting arrangement to compensate for resulting thermal expansion of the electrode, thus maintaining the electrode in tension, such that it is held substantially straight.

28 Claims, 5 Drawing Figures

INK JET PRINTER WITH HEATED DEFLECTION ELECTRODE

BACKGROUND OF THE INVENTION

The present invention relates to ink jet printers and, more particularly, to such a printer in which the jet drop deflection electrode structure is heated above the ambient temperature to preclude drop condensation and accumulation thereon.

As shown in U.S. Pat. No. 3,701,998, issued Oct. 31, 1972, to Mathis, printers of the type to which the present invention relates may generally include a print head which has a fluid receiving reservoir and an orifice plate communicating with the reservoir. The orifice plate defines at least one row, and in a printer such as shown in Mathis, two rows of jet orifices through which ink is forced under pressure to form a plurality of jet drop streams. A fluid ink filament emerges from each of the orifices and drops of substantially uniform size are formed periodically from the filament tips. The regularity of drop formation is enhanced through one of a number of drop stimulation techniques, which may include mechanical stimulation of the entire print head structure or of the orifice plate, as shown in U.S. Pat. No. 3,739,393, issued June 12, 1973, to Lyon et al.

Charging electrodes are positioned adjacent the points at which the drops are formed and induce selectively charged drops in each of the jet drop streams. The jet drop streams thereafter pass through a deflection field which separates the charged and uncharged drops, a portion of the drops being directed in a catch trajectory and the remainder of drops being directed in a print trajectory. In the Mathis printer, two such rows of jet drop streams are provided with a pair of drop catchers positioned parallel to the jet drop stream rows and spaced outwardly therefrom. A deflection electrode is positioned between the rows of jet drop streams and has an electrical deflection potential impressed thereon which deflects the charged drops outwardly such that they strike the catchers. The uncharged drops, however, pass unaffected through the deflection field and strike a print receiving medium, collectively forming a print image thereon. Formation of the print image, therefore, is controlled by controlling charging of the drops in the drop streams.

In order to produce the desired deflection of the charged drops outwardly to the catchers, a relatively high d.c. electrical potential, on the order of 1,000 volts, is applied to the deflection electrode. The catchers are generally formed of electrically conductive material and are typically grounded such that a deflection field is created which extends between each of the catchers and the deflection electrode.

The drop stimulation technique known in the prior art generally result in jet drop streams of uniformly sized drops which are regularly spaced along the stream trajectory. Nevertheless, much smaller drops, termed "satellite drops," may occasionally be formed, giving rise to an ink mist consisting of extremely small drops which may be uncharged or may be charged to varying charge levels of either charge polarity. While very little mist may be present at any one time, the droplets forming the mist may gradually build over a period of time on various portions of the printer structure, including the deflection electrode. Since the ink used in printers of this type is generally conductive, buildup of such ink on the high voltage deflection electrode is extremely undesirable in that the deflection electrode may be shorted to adjacent grounded printer structure by the electrically conductive ink. Shorting of the deflection electrode to associated printer structure for substantial periods may result in excessive current flow from the deflection electrode power supply circuitry, thus overloading the power supply circuit. Additionally, such extended shorting of the deflection electrode may result in the deflection field collapsing such that charged drops are not deflected outward sufficiently to be caught.

Additionally, if a substantial quantity of ink should accumulate at a point on the deflection electrode, a phenomenon known as electrodynamic spraying may occur in which the ink on the deflection electrode is sprayed outward from the electrode in a direction parallel to the deflection field. As will be understood, this may interfere substantially with operation of the ink jet printer and result in deterioration of the print image formed on the print receiving medium. It is seen, therefore, that it is highly desirable to provide an arrangement which prevents buildup of a conductive ink mist on the surfaces of the printer elements.

Larger quantities of ink may also accumulate on the deflection electrode as a result of one or more crooked jet drop streams. This phenomenon occurs most commonly at the beginning of operation of the printer. Additionally, the jet drop streams during printer start up may include drops of a substantially larger size than those that are produced during normal printer operation. Some of these large drops may also strike the deflection electrode. Thus a substantially greater quantity of ink may be deposited on the deflection electrode at the initiation of printer operation than occurs as a result of satellite drop formation during the course of normal printer operation.

U.S. Pat. No. 4,023,183, issued May 10, 1977, to Takano et al, discloses an ink jet printer in which a plurality of cylindrical deflection electrodes are positioned on opposite sides of a single jet drop stream. An electrical potential differential is placed across the cylindrical electrodes such that drops which are charged are deflected in a print trajectory, while uncharged drops pass unaffected through the deflection field and are caught by a catcher arrangement. Each of the deflection electrodes is rotatably mounted with electrode cleaners installed adjacent the electrodes on the opposite sides of the electrodes from the jet drop stream. The electrodes are rotated past the cleaners with the result that any ink mist which may condense upon the electrode surface is removed.

Various drop catcher arrangements have been devised for eliminating buildup of ink mist deposited upon the drop catcher surfaces. As shown in U.S. Pat. No. 3,777,307, issued Dec. 4, 1973, to Duffield, a portion of the catcher may be formed of a porous material with a compartment within the catcher connected to a vacuum source. Ink mist accumulating on the porous surface is therefore drawn into the compartment within the catcher and thereafter removed.

Similarly, as shown in U.S. Pat. No. 4,031,563, issued June 21, 1977, to Paranjpe et al, a relatively thin deflection electrode, arranged to extend between a pair of parallel rows of jet drop streams, has been devised in which the electrode is formed of a porous material which defines a cavity therein. Suction is applied to the ends of the deflection electrode such that any ink mist forming upon the electrode is injected into the electrode cavity and thereafter removed. Although a porous deflection electrode as shown in the Paranjpe et al patent provides substantial advantages over non-porous electrodes, such as shown in the Mathis patent, such porous deflection electrodes may be limited in length, since the electrode must have a substantial partial vacuum maintained along the entire length of the electrode cavity in order to ensure effective drop ingestion. Additionally, it will be appreciated that the minimum thickness of such an electrode is limited by the minimum width of the cavity within the electrode required for sufficient vacuum. Thus, such an electrode necessitates spacing apart the rows of jet drop streams by a certain minimum distance.

U.S. Pat. No. 4,050,377, issued Sept. 27, 1977, to Watanabe et al, discloses a mist printer having an aperture board defining openings therein through which ions pass into an ink mist to charge electrically ink droplets within the mist. The charged ink droplets are attracted to a print receiving medium in a desired pattern by means of an electrode positioned behind the medium. A resistive heating element is positioned within a cavity defined by the aperture board such that the relative humidity within the cavity is reduced. Air is continuously supplied to the cavity within the board and emerges through the openings in the board. As a result of the lowered relative humidity, moisture in the air is prevented from condensing on the board and the exposed metallic portions of the board, therefore, do not accumulate rust.

Thus, it is seen that there is a need for a simple, effective means of reducing condensation on a deflection electrode of the type used in an ink jet printer.

SUMMARY OF THE INVENTION

An ink jet printer for depositing a plurality of ink drops upon a moving print receiving medium to form a print image thereon includes a print head means for generating a plurality of jet drop streams directed at the moving print receiving medium with the streams arranged in rows. A drop charging means, adjacent each of the jet drop streams, selectively charges drops in the drop streams. A drop ingesting catcher extends parallel to the row of jet drop strams and is spaced therefrom for catching drops deflected into catch trajectories such that the drops are not deposited upon the print receiving medium. An electrically conductive deflection electrode extends parallel to the drop ingesting catcher such that the row of jet drop streams passes between the electrode and the drop ingesting catcher. Means is provided for applying a d.c. deflection potential to the deflection electrode, such that appropriately charged drops are deflected into catch trajectories and are caught by the catcher. A means is provided for heating the deflection electrode to prevent drop condensation thereon, thus preventing shorting of the deflection electrode to adjacent, electrically grounded printer structure.

The printer, including the heated deflection electrode, may alternatively comprise a print head means for generating a plurality of jet drop streams arranged in a pair of parallel rows. A pair of drop ingesting catchers extend parallel to the pair of parallel rows of jet drop streams and are spaced outwardly therefrom. The electrically conductive deflection electrode extends parallel to and intermediate the drop ingesting catchers such that one of the pair of parallel rows of jet drop streams passes to either side of the deflection electrode, between the electrode and each of the pair of drop ingesting catchers. Application of the d.c. deflection potential to the deflection electrode results in charged drops being deflected outward from the deflection electrode into catch trajectories in which they are caught by a respective one of the pair of catchers.

The means for heating the deflection electrode may comprise electrical current source means for providing a heating current through the deflection electrode such that the electrode is resistively heated. This current source means may include means for applying an a.c. heating current through the deflection electrode. The means for applying an a.c. heating current through the deflection electrode comprises an a.c. electrical power source, having a pair of power output terminals, and d.c. isolation means, connected to each end of the deflection electrode and to the power output terminals of the a.c. electrical power source, for coupling the a.c. current from the a.c. electrical power source to the deflection electrode while maintaining d.c. isolation between the a.c. electrical power source and the means for applying a d.c. deflection potential to the deflection electrode.

The d.c. isolation means may include an isolation transformer having a primary winding electrically responsive to the a.c. electrical power source and a secondary winding connected electrically in series with the deflection electrode. The d.c. isolation means may further include adjustable means connected to the output terminals of the a.c. electrical power source and to the primary winding of the isolation transformer for adjustably coupling the output of the a.c. power source to the primary winding. The adjustable means may advantageously comprise an adjustable autotransformer.

An electrode mounting means may be provided for positioning the electrode parallel to and intermediate the pair of drop ingesting catchers. The mounting means may include a spring means for maintaining tensioning of the deflection electrode during thermal expansion thereof.

Accordingly, it is an object of the present invention to provide an ink jet printer having a deflection electrode heated above the ambient temperature of the printer in order to prevent condensation of ink drops thereon; to provide such an ink jet printer in which the deflection electrode is heated by means of a resistive heating current which is applied to the deflection electrode; to provide such an ink jet printer in which the resistive heating current is an a.c. current which is applied to the deflection electrode by the secondary winding of an isolation transformer which is connected in series with the deflection electrode; and to provide such an ink jet printer in which the amount of resistive heating current applied to the deflection electrode is adjustable.

Other objects and advantages of the invention will be apparent from the following description, the accompanying drawings and the appended claims.

DETAILED DESCRIPTION OF THE PREFERRED EMBODIMENTS

Figure 1:
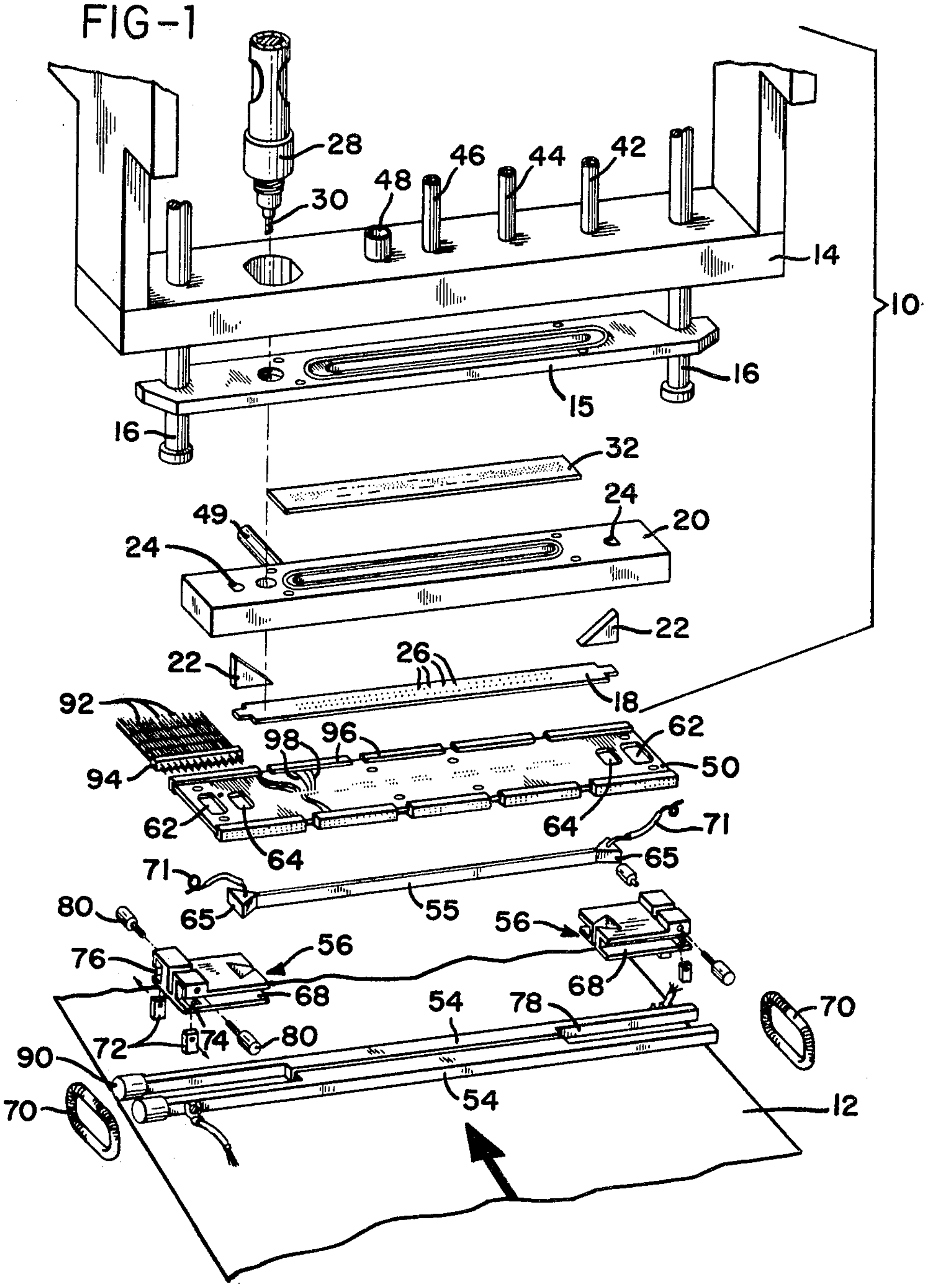
FIG. 1 is an exploded perspective view of an ink jet printer constructed according to the present invention.

Reference is now made to FIG. 1 of the drawings which is an exploded perspective view illustrating a printer constructed according to the present invention. A print head means 10 is provided for generating a plurality of jet drop streams which are directed at a moving print receiving medium 12. As more fully described below, the drops from the jet drop streams are deposited upon the print receiving medium 12 in such a manner as to form a print image on medium 12. The print heat means 10 includes a number of elements which are assembled for support by a support bar 14. Assembly thereto is accomplished by attaching the elements by means of machine screws (not shown) to a clamp bar 15 which is, in turn, connected to the support bar 14 by means of clamp rods 16.

The print head means further includes an orifice plate 18 which is soldered, welded, or otherwise bonded to fluid supply manifold 20 with a pair of wedge-shaped acoustical dampers 22 therebetween. Orifice plate 18 is preferably formed of a relatively stiff material such as stainless steel or nickel coated berylium-copper, but is relatively thin to provide the required flexibility for direct contact stimulation. Preferably, dampers 22 are cast in place by pouring polyurethane rubber or suitable damping material through openings 24 while tilting manifold 20 at an appropriate angle from the vertical.

Orifice plate 18 defines two rows of orifices 26 from which a pair of parallel rows of jet drop streams issue. Orifice plate 18 is preferably stimulated by stimulator 28 which is threaded into clamp bar 15 to carry a stimulation probe 30 through the manifold 20 and into direct contact with orifice plate 18. Orifice plate 18 manifold 20, clamp bar 15, together with a filter plate 32 comprise a clean package which may be preassembled and kept closed to prevent dirt or foreign material from reaching and clogging orifices 26. Service connections for the print head means include an ink supply tube 42, air exhaust and inlet tubes 44 and 46, and a tube 48 for connection to a pressure transducer (not shown). A flushing conduit 49 may also be provided.

The printer further includes a drop charging means, adjacent each of the jet drop streams, for selectively charging drops in the drop streams. The charging means may take the form of a charge ring plate 50 which is described more completely below.

The printer also comprises a pair of drop ingesting catchers 54 which extend parallel to the pair of parallel rows of jet drop streams and are spaced outwardly therefrom for catching drops deflected into catch trajectories, such that the drops are not deposited upon the print receiving medium 12. An electrically conductive deflection electrode 55 is provided which extends parallel to and intermediate the pair of drop ingesting catchers 54, such that one of the pair of parallel rows of jet drop streams passes either side of the deflection electrode between the electrodes and each of the pair of drop ingesting catchers.

Catchers 54 are supported by holders 56 which are fastened directly to fluid supply manifold 20. Spacers (not shown) reach through apertures 62 and 64 in charge ring plate 50 to support holders 56 without stressing or constraining the charge ring plate 50. Deflection electrode 55 may consist of a thin ribbon of substantially electrically conductive material, such as stainless steel, which is attached at each end to conductive mounting blocks 65. Deflection electrode 55 is also supported by holders 56 and is stretched tightly therebetween, such that it extends in a substantially straight line between the rows of jet drop streams.

Catchers 54 are laterally adjustable relative to deflection electrode 55. This adjustability is accomplished by assembling the printer with catchers 54 resting in slots 68 of holders 56, and urging them mutually inward with a pair of elastic bands 70. Adjusting blocks 72 are inserted upwardly through recesses 74 and 76 to bear against faces 78 of catches 54. Adjusting screws 80 are provided to drive adjusting blocks 72 and catchers 54 outwardly against elastic bands 70. Holders 56 may be made of insulative material such as reinforced plastic board, thereby providing electrically insulated mounting of the catchers 54 and the deflection electrode 55.

Figure 2:
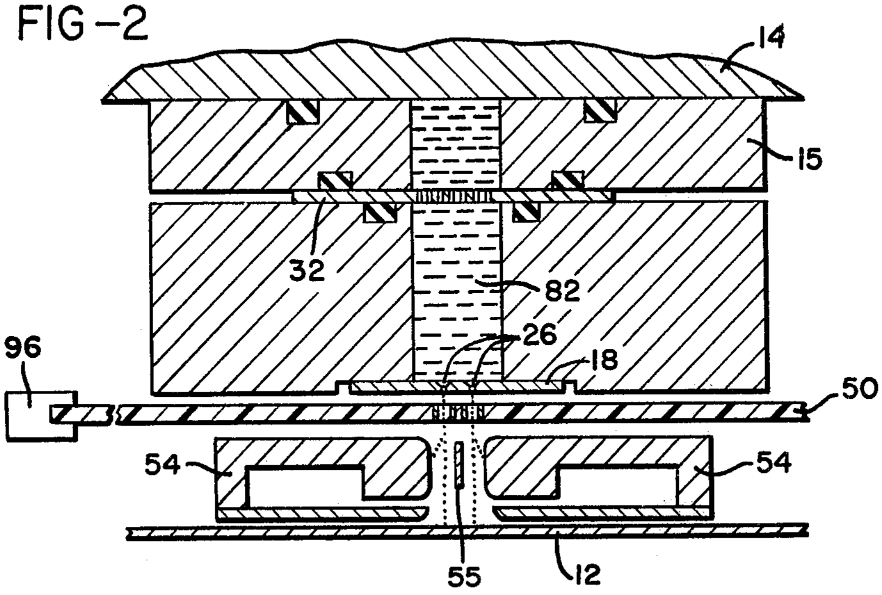
FIG. 2 is a sectional view of the printer of FIG. 1, taken in a plane generally perpendicular to the rows of jet drop streams.
Figure 3:
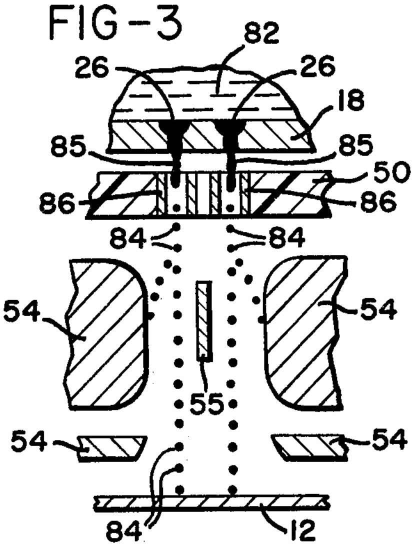
FIG. 3 is an enlarged partial sectional view, similar to FIG. 2.

The fully assembled ink jet printer is shown in cross-section in FIGS. 2 and 3. As therein illustrated, ink 82 flows downwardly through orifices 26, forming two rows of jet drop streams including drops 84. Drops 84 are formed from fluid filaments 85 within charge rings 86 in charge ring plate 50. The drops, selectively charged by the charge rings 86, thereafter are directed into either catch trajectories in which they strike one of the catchers 54 or, alternatively, into print trajectories in which they strike the print receiving medium 12.

Switching of drops between catch and print trajectories is accomplished by electrostatic charging and deflection as described below. Coordinated printing capability may be achieved by staggering the two rows of jet drop streams in accordance with the teachings of Taylor et al, U.S. Pat. No. 3,566,401. As taught in that patent, the drops in the forward row of streams (i.e. the row most advanced in the direction of movement of the print receiving medium 12) are switched in a time frame which is delayed from that of the rear row of jet drop streams by a time d/V, where d is the spacing between the rows of jet drop streams and V is the speed of the moving print receiving medium. This produces a coherence between the rows such that the streams function as a single row, with an effective stream spacing equal to half of the actual spacing between jet drop streams in either of the rows.

Formation of drops 84 is closely controlled by application of a constant frequency, controlled amplitude, stimulating disturbance to each of the fluid filaments 85 emanating from orifice plate 18. Disturbances for this purpose may be set up by operating transducer 28 to vibrate probe 30 at a constant amplitude and frequency against plate 18. This causes a continuing series of bending waves to travel the length of the plate 18. Each wave produces a drop stimulating disturbance at it passes each of the orifices 26 in succession. Dampers 22 prevent reflection and repropagation of these waves.

As each drop 84 is formed, it is exposed to the charging influence of one of the charge rings 86. If the drop is to be deflected and caught, an electrical charge is applied to the associated charge ring 86 during the instant of drop formation. This causes an electrical charge to be induced in the tip of the fluid filament and thereafter carried away by the drop. As the drop traverses the deflecting field set up between deflection electrode 55 and the face of the adjacent catcher 54, it is deflected to strike and run down the face of the catcher, where it is ingested and carried off. Drop ingestion may be promoted by application of a suitable vacuum to the ends 90 of catchers 54. When drops which are to be deposited upon a print receiving medium 12 are formed, no electrical charge is applied to the associated charge rings.

Appropriate charges for accomplishing the abovementioned drop charging are induced by setting up an electrical potential difference between ink 82 and respective charge rings 86. These potential differences are created by grounding plate 18 and applying appropriately timed voltage pulses to wires 92 in connectors 94, only one such connector being illustrated. Connectors 94 are plugged into receptacles 96 at the edge of charge ring plate 50 and deliver the above-mentioned voltage pulses over printed circuit lines 98 to charge rings 86.

Charge ring plate 50 is fabricated from insulative material and charge rings 86 are merely coatings of conductive material which line the surfaces of orifices in the charge ring plate. Voltage pulses for the above purpose may be generated by circuits of the type disclosed in Taylor et al, and wires 92 receiving these pulses may be matched with charge rings 86 on a one-to-one basis. Alternatively, the voltage pulses may be multiplexed to decrease the number of wires and connectors.

Figure 4:
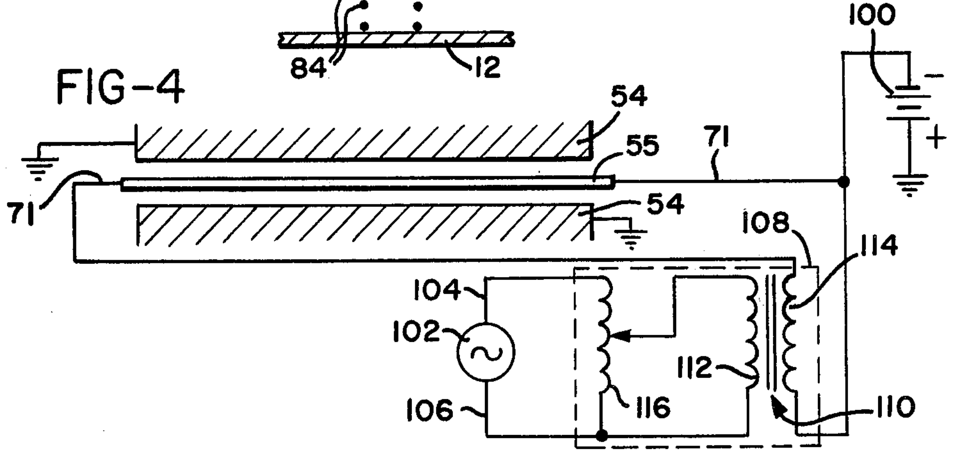
FIG. 4 is a schematic representation of circuitry for providing a resistive heating current to the deflection electrode of the printer.

As discussed above, deflection of drops 84 which are to be caught is accomplished by setting up appropriate electrical fields between deflection electrode 55 and each of the catchers 54. The preferred arrangement for this function is shown in FIG. 4, wherein catchers 54 and one side of an electrical deflection potential source 100 are all connected to a common ground. The other side of potential source 100 is connected to deflection electrode 55, thereby setting up a pair of equal strength, oppositely directed electrical deflection fields. With such an arrangement, it is necessary that the drops 84 be charged negatively in order to be deflected outward from the deflection electrode 55. However, it is also possible to obtain mutual outward deflection of the drops in the pair of rows of jet drop streams by charging the drops 84 positively and reversing the terminal connections of the source 100.

As discussed above, the gradual accumulation of ink mist upon a deflection of the type utilized in the disclosed ink jet printer produces deterioration in the operation of the printer and, additionally, may result in damage to the printer or the deflection electrode power supply circuitry. It has been found, however, that by heating the deflection electrode to a temperature greater than the ambient temperature of the environment in which the printer operates, condensation of ink mist droplets upon the deflection electrode may be prevented, and printer operation and reliability thereby enhanced.

In order to heat the deflection electrode 55, a circuit as shown in FIG. 4 is connected as an electrical current source means for providing resistive heating of the deflection electrode by supplying a heating current through the deflection electrode. While the deflection electrode material may be generally categorized as electrically conductive, the electrode material is not perfectly conductive. The electrodes may typically possess a finite resistance, on the order of 1 ohm, as measured across the ends of the electrode. If a sufficient resistive heating current is passed through the deflection electrode, the $I^2R$ heating which results heats the electrode to a temperature above the ambient temperature of the environment in which the printer is operating, thereby preventing condensation of ink mist on the deflection electrode.

Although a relatively small increase in temperature of the deflection electrode 55 above the printer ambient temperature results in a substantial reduction in the amount of mist which may accumulate on the deflection electrode, it is desirable for some applications to heat the deflection electrode 55 to an even higher temperature, on the order of 300°–400° F., by applying approximately 8 watts of power to the electrode. By heating the electrode to a relatively high temperature, it has been found that the deleterious effects of crooked jet drop streams upon operation of the electrode may in large part be avoided. Crooked jet drop streams most frequently occur at start up of the printer as the ink initially passes through the orifices in the orifice plate 18. Generally such crooked jet drop streams are self-correcting within a very short period of time. Additionally, the problem of formation of unusually large drops which occurs at printer start up is self-correcting in that such drops are generally not formed by jets after the start up period.

Various notched charge electrode designs, such as shown in U.S. Pat. No. 3,618,858, issued Nov. 9, 1971, to Culp, and assigned to the assignee of the present invention, have been developed which permit the charge electrodes to be moved into position after the flow of ink has begun through the orifices and the crooked jet drop streams have been eliminated. It will be appreciated however, that in a two-row printer of the type shown in Mathis, the deflection electrode must remain in position between the rows of jet drop streams during start up of the printer and cannot be moved into place subsequently. It quite commonly happens, therefore, that a large quantity of ink strikes the deflection electrode during start up of the printer. While a deflection electrode heated to a fairly low temperature, below the boiling point of the ink, would eventually cause a large quantity of ink to be evaporated from the electrode, all of the ink particles in the water base ink would remain upon the electrode and, over a period of time, interfere with operation of the electrode. By heating the deflection electrode to a temperature above the ink boiling point, typically in the 300°–400° F. range for a water base ink, a drop of ink striking the electrode tends to slide down the electrode surface very quickly and fall off of the bottom of the electrode before the ink has evaporated. This phenomenon results from the rapid vaporization of the ink fluid in the portion of the drop directly contacting the electrode. The resulting vapor acts as a vapor cushion, preventing surface tension forces from causing the drop to adhere to the electrode. Additionally, this vapor cushion, once formed, acts as an insulating barrier between the heated deflection electrode and the drop, thus reducing further heat transfer between the electrode and the drop and reducing further evaporation of the drop.

Although either an a.c. or d.c. heating current may be applied through the deflection electrode 55 to produce the desired heating of the electrode, application of an a.c. heating current through the deflection electrode is preferred, since such a current can be applied to the electrode while maintaining an isolation between the resistive heating current supply and the deflection potential source 100.

As seen in FIG. 4, an a.c. electrical power source 102, having a pair of power output terminals 104 and 106, is connected to a d.c. isolation means 108 which couples a.c. current from the power source 102 to the deflection electrode 55, while maintaining d.c. isolation between power source 102 and the means for applying the d.c. deflection potential to the deflection electrode. The isolation means 108 includes an isolation transformer 110, having a primary winding 112 responsive to the a.c. electrical power source 102, and a secondary winding 114 connected electrically in series with the deflection electrode 55. The isolation means 108 further includes an adjustable autotransformer 116 which provides an adjustable means, connected to the output terminals 104 and 106 of the a.c. electrical power source 102 and to the primary winding 112 of the isolation transformer 110, for adjustably coupling the output of the a.c. power source 102 to the primary winding 112. It will be appreciated that by adjusting the autotransformer 116, the voltage across the secondary winding 114 and, therefore, the current through the deflection electrode 55 may be suitably adjusted such that the deflection electrode 55 is heated to the desired temperature.

It will be appreciated that the net effect of applying the a.c. resistive heating current to the deflection electrode 55 is to alter slightly the potential of the deflection electrode 55 adjacent the end of the electrode which is not connected directly to the deflection potential source 100. Since the resistance of the deflection electrode 55 is relatively low, on the order of 1 ohm, and further, since the current supplied to the electrode is also very small, the fluctuation in potential of the electrode 55 is not significant. Since source 100 raises the potential of the deflection electrode 55 with respect to ground approximately 1,000 volts, it can be seen that a small periodic fluctuation in the deflection potential of portions of the deflection electrode 55 is virtually negligible. Further, the only effect that such minor fluctuations in deflection potential have is to alter slightly the catch trajectories of charged drops passing through the deflection field. In view of the substantial areas of the drop catching surfaces of catchers 54, such minor variations in catch trajectories are not critical and charged drops are deflected sufficiently for catching, regardless of small fluctuations in the deflection field.

It will be appreciated that the d.c. isolation provided in the circuit of FIG. 4 is not critical to operation of the printer, provided the power supply supplying the resistive heating current to the deflection electrode 55 is sufficiently isolated from grounded printer elements. It will be further appreciated that a d.c. resistive heating current may be utilized in a printer incorporating a heated deflection electrode, with or without isolation from the deflection potential source.

As should be clear from the above, the heated deflection electrode of the present invention is applicable to both multiple jet row and single jet row ink jet printers. Single jet row printers may be constructed with a single catcher extending parallel to the row of jets along one side of the row and the deflection electrode extending parallel to the catcher on the opposite side of the jet row. Ink accumulation on the deflection electrode presents a problem with either type of printer, however.

Figure 5:
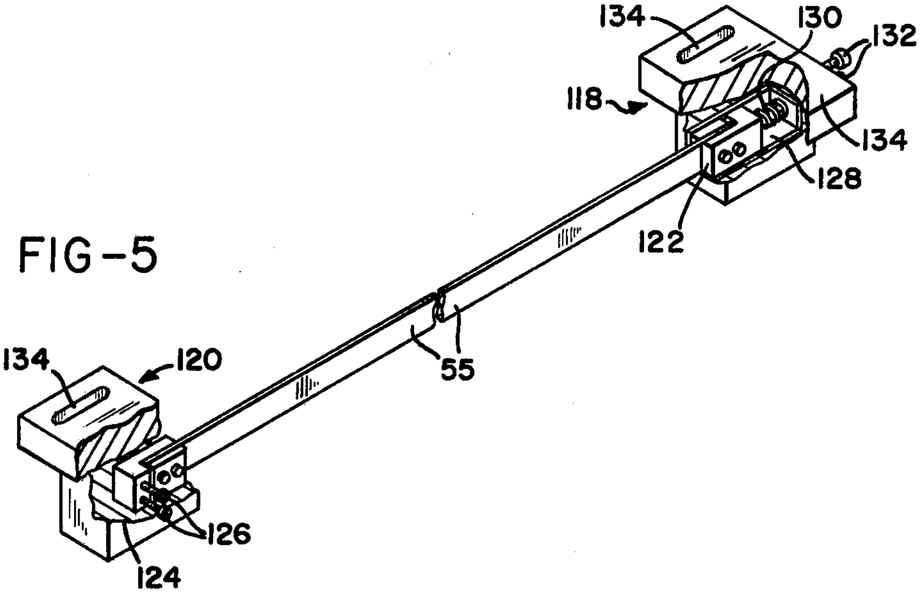
FIG. 5 is a perspective view of a deflection electrode mounting arrangement, with portions broken away to reveal interior structure.

Reference is now made to FIG. 5 which illustrates an alternative arrangement providing a mounting means for mounting the deflection electrode such that it extends adjacent and substantially parallel to the row or rows of jet drop streams. The mounting arrangement includes a pair of nonconductive mounting blocks 118 and 120 in which electrode clamp blocks 122 and 124 are positioned, respectively. Blocks 122 and 124 are electrically conductive and engage ends of the deflection electrode 55. Block 124 is fixedly positioned in mounting block 120 and has a pair of connector bolts 126 extending therefrom which provide a means for electrically connecting the end of the electrode 55 to the associated current source. Clamp block 122 is slidingly positioned in a slot 128 within mounting block 118. A spring 130, formed of conductive spring material, is attached to the clamp block 122 and also to a pair of electrical connectors 132 through the mounting block 118.

Mounting blocks 118 and 120 are fastened directly to the fluid supply manifold of the associated printer through spacers which reach through apertures in the charge ring plate by means of bolts extending upward through slots 134. In assembling a printer using mounting blocks 118 and 120, the catchers 54 must be supported by external support structure. Spring 130 provides a spring force which maintains deflection electrode 55 under tension during operation of the printer. The deflection electrode is sufficiently thin and flexible that if this tension is not maintained, the electrode may tend to deflect laterally and may interfere with the print trajectories of the jet drop streams. By providing for sliding movement of block 122, thermal expansion of the deflection electrode 55 which occurs during heating of the electrode is compensated and the necessary electrode tension is maintained. The spring 130, connecting clamp block 122 and electrical connectors 132, provide a means of applying current to the associated end of the deflection electrode 55.

While the method and forms of apparatus herein described constitute preferred embodiments of the invention it is to be understood that the invention is not limited to these precise method and forms of apparatus, and that changes may be made therein without departing from the scope of the invention.

What is claimed is:

1. An ink jet printer for depositing a plurality of ink drops upon a moving print receiving medium to form a print image thereon, comprising:

print head means for generating a plurality of jet drop streams directed at said moving print receiving medium, said streams being arranged in a pair of parallel rows, drop charging means, adjacent each of said jet drop streams, for selectively charging drops in said drop streams, a drop ingesting catcher extending parallel to said row of jet drop streams and spaced therefrom for catching drops deflected into catch trajectories such that said drops are not deposited upon said print receiving medium, a substantially electrically conductive deflection electrode extending parallel to said drop ingesting catcher, such that said row of jet drop streams passes between said deflection electrode and said drop ingesting catcher, means for applying a d.c. deflection potential to said deflection electrode, such that appropriately charged drops are deflected into catch trajectories and are caught by said catcher, and means for heating said deflection electrode to prevent drop condensation thereon, thus preventing shorting of said deflection electrode to adjacent electrically grounded printer structure.

2. The printer of claim 1 in which said means for heating said deflection electrode means comprises electrical current source means for providing resistive heating of said deflection electrode.

3. The printer of claim 1 in which said means for heating said deflection electrode comprises electrical current source means for providing a heating current through said deflection electrode such that said electrode is resistively heated thereby.

4. The printer of claim 3 in which said electrical current source means comprises means for applying an a.c. heating current through said deflection electrode.

5. The printer of claim 4 in which said means for applying an a.c. heating current through said deflection electrode comprises:

an a.c. electrical power source, having a pair of power output terminals, and d.c. isolation means, connected to each end of said deflection electrode and to said power output terminals of said a.c. electrical power source, for coupling an a.c. current from said a.c. electrical power source to said deflection electrode while maintaining d.c. isolation between said a.c. electrical power source and said means for applying a d.c. deflection potential to said deflection electrode.

6. The printer of claim 5 in which said d.c. isolation means comprises an isolation transformer having a primary winding electrically responsive to said a.c. electrical power source and a secondary winding connected electrically in series with said deflection electrode.

7. The printer of claim 6 in which said d.c. isolation means further comprises adjustable means, connected to said output terminals of said a.c. electrical power source and to said primary winding of said isolation transformer, for adjustably coupling the output of said a.c. power source to said primary winding.

8. The printer of claim 7 in which said adjustable means comprises an adjustable autotransformer.

9. A deflection arrangement for providing a static drop deflecting electrical field in an ink jet printer in which drops from a plurality of jet drop streams positioned in a row are selectively deflected by the field, comprising:

a substantially electrically conductive deflection electrode extending adjacent and substantially parallel to said row of jet drop streams, means for applying a d.c. deflection potential to said deflection electrode such that said drop deflecting field is created, and means for heating said deflection electrode to prevent drop condensation thereon, thus preventing shorting of said deflection electrode to adjacent, electrically grounded printer structure.

10. The deflection arrangement of claim 9 in which said means for heating said deflection electrode means comprises electrical current source means for providing a resistive heating of said deflection electrode.

11. The deflection arrangement of claim 9 in which said means for heating said deflection electrode comprises electrical current source means for providing a heating current through said deflection electrode such that said electrode is resistively heated thereby.

12. The deflection arrangement of claim 11 in which said electrical current source means comprises means for applying an a.c. heating current through said deflection electrode.

13. The deflection arrangement of claim 12 in which said means for applying an a.c. heating current through said deflection electrode comprises:

an a.c. electrical power source, having a pair of power output terminals, and d.c. isolation means, connected to each end of said deflection electrode and to said power output terminals of said a.c. electrical power source, for coupling an a.c. current from said a.c. electrical power source to said deflection electrode while maintaining d.c. isolation between said a.c. electrical power source and said means for applying a d.c. deflection potential to said deflection electrode.

14. The deflection arrangement of claim 13 in which said d.c. isolation means comprises an isolation transformer having a primary winding electrically responsive to said a.c. electrical power source and a secondary winding connected electrically in series with said deflection electrode.

15. The deflection arrangement of claim 14 in which said d.c. isolation means further comprises adjustable means, connected to said output terminals of said a.c. electrical power source and to said primary winding of said isolation transformer for adjustably coupling the output of said a.c. power source to said primary winding.

16. The deflection arrangement of claim 15 in which said adjustable means comprises an adjustable autotransformer.

17. The deflection arrangement of claim 9 further comprising electrode mounting means for mounting said deflection electrode such that it extends adjacent and substantially parallel to said row of jet drop streams, said electrode mounting means including spring means for tensioning said deflection electrode and maintaining said deflection electrode under tension during lengthening of said deflection electrode resulting from thermal expansioning.

18. An ink jet printer for depositing a plurality of ink drops upon a moving print receiving medium to form a print image thereon, comprising:

print head means for generating a plurality of jet drop streams directed at said moving print receiving medium, said streams being arranged in a pair of parallel rows, drop charging means, adjacent each of said jet drop streams, for selectively charging drops in said drop streams, a pair of drop ingesting catchers extending parallel to said pair of parallel rows of jet drop streams and spaced outwardly therefrom for catching drops deflected into catch trajectories such that said drops are not deposited upon said print receiving medium, a substantially electrically conductive deflection electrode extending parallel to and intemediate said pair of drop ingesting catchers, such that one of said pair of parallel rows of jet drop streams passes to either side of said deflection electrode between said electrode and each of said pair of drop ingesting catchers, means for applying a d.c. deflection potential to said deflection electrode, such that appropriately charged drops are deflected outward therefrom in catch trajectories and are caught by a respective one of said pair of catchers, and means for heating said deflection electrode to prevent drop condensation thereon, thus preventing shorting of said deflection electrode to adjacent electrically grounded printer structure.

19. The printer of claim 18 in which said means for heating said deflection electrode means comprises electrical current source means for providing resistive heating of said deflection electrode.

20. The printer of claim 18 in which said means for heating said deflection electrode comprises electrical current source means for providing a heating current through said deflection electrode such that said electrode is resistively heated thereby.

21. The printer of claim 20 in which said electrical current source means comprises means for applying an a.c. heating current through said deflection electrode.

22. The printer of claim 21 in which said means for applying an a.c. heating current through said deflection electrode comprises:

an a.c. electrical power source, having a pair of power output terminals, and d.c. isolation means, connected to each end of said deflection electrode and to said power output terminals of said a.c. electrical power source, for coupling an a.c. current from said a.c. electrical power source to said deflection electrode while maintaining d.c. isolation between said a.c. electrical power source and said means for applying a d.c. deflection potential to said deflection electrode.

23. The printer of claim 22 in which said d.c. isolation means comprises an isolation transformer having a primary winding electrically responsive to said a.c. electrical power source and a secondary winding connected electrically in series with said deflection electrode.

24. The printer of claim 23 in which said d.c. isolation means further comprises adjustable means, connected to said output terminals of said a.c. electrical power source and to said primary winding of said isolation transformer, for adjustably coupling the output of said a.c. power source to said primary winding.

25. The printer of claim 24 in which said adjustable means comprises an adjustable autotransformer.

26. A method of preventing condensation on a substantially electrically conductive deflection electrode in an ink jet printer in which said deflection electrode extends substantially parallel to a row of ink jet drop streams and has a d.c. electrical deflection potential impressed thereon such that a static electrical deflection field is created for deflection of charged drops in said jet drop streams, comprising the step of heating said deflection electrode to a temperature which is greater than the ambient temperature in which the printer operates.

27. The method of claim 26 in which said step of heating said deflection electrode includes the step of resistively heating said conductive deflection electrode by applying a heating current therethrough.

28. The method of claim 26 in which said step of heating said deflection electrode includes the step of heating said deflection electrode to a temperature in the range of 300°–400° F.

* * * * *